United States Patent [19]

Sho et al.

[11] Patent Number: 5,700,862
[45] Date of Patent: Dec. 23, 1997

[54] AQUEOUS COATING COMPOSITION

[75] Inventors: Katsuhiko Sho, Mino; Yasuhiro Shibata, Suita; Keizou Ishii, Ashiya; Tsuyoshi Imamura, Katano; Kunihiko Takeuchi, Mino, all of Japan

[73] Assignee: Nippon Paint Co., Ltd., Osaka, Japan

[21] Appl. No.: 451,491

[22] Filed: May 26, 1995

Related U.S. Application Data

[63] Continuation-in-part of Ser. No. 255,996, Jun. 8, 1994, abandoned.

[30] Foreign Application Priority Data

Jun. 11, 1993 [JP] Japan .................... 5-140424

[51] Int. Cl.$^6$ ........................................ C08K 3/08
[52] U.S. Cl. ............ 524/403; 524/521; 524/501; 524/507; 524/555; 524/558; 524/413; 524/437; 524/441
[58] Field of Search .................... 524/507, 403, 524/413, 437, 441, 521, 558, 555, 501

[56] References Cited

U.S. PATENT DOCUMENTS

| | | | |
|---|---|---|---|
| 4,022,737 | 5/1977 | Sekmakas et al. | 260/29.4 UA |
| 4,277,385 | 7/1981 | Carroll et al. | 260/29.6 RW |
| 4,283,320 | 8/1981 | Carroll et al. | 260/29.6 RW |
| 4,403,003 | 9/1983 | Backhouse | 427/407.1 |
| 4,469,825 | 9/1984 | Kowalski et al. | 523/201 |
| 4,489,135 | 12/1984 | Drexler et al. | 428/423.1 |
| 4,522,961 | 6/1985 | Martino et al. | 523/407 |
| 4,624,973 | 11/1986 | Kuwajima et al. | 523/221 |
| 4,683,260 | 7/1987 | Wickert | 524/512 |
| 4,777,213 | 10/1988 | Kanda et al. | 525/114 |
| 4,803,252 | 2/1989 | Kida et al. | 526/297 |
| 4,908,468 | 3/1990 | Muramoto et al. | 560/14 |
| 4,920,175 | 4/1990 | Kanda et al. | 525/110 |
| 5,017,646 | 5/1991 | Muramoto et al. | 524/807 |
| 5,115,020 | 5/1992 | Muramoto et al. | 525/74 |
| 5,166,254 | 11/1992 | Nickle | 524/512 |
| 5,183,504 | 2/1993 | Kuwajima et al. | 106/404 |
| 5,331,042 | 7/1994 | Charmot et al. | 524/556 |
| 5,371,148 | 12/1994 | Taylor et al. | 525/293 |

*Primary Examiner*—Erma Cameron
*Attorney, Agent, or Firm*—Townsend&Banta

[57] ABSTRACT

An aqueous coating composition comprising: (A) 10 to 95% by weight (based on solid content) of a film forming polymer which is prepared by neutralizing at least a part of acid groups contained in a copolymer having a number average molecular weight ranging from 6,000 to 50,000 prepared by copolymerizing (A1) 5 to 40% by weight of an amide group-containing ethylenically unsaturated monomer, (A2) 3 to 15% by weight of an acid group-containing ethylenically unsaturated monomer, (A3) 10 to 40% by weight of a hydroxyl group-containing ethylenically unsaturated monomer, and (A4) a remainder amount of ethylenically unsaturated monomers other than the monomers (A1) to (A3); and (B) 5 to 90% by weight (based on solid content) of an aqueous dispersion of carboxyl group-containing acrylic resin particles having a particle size ranging from 0.01 to 1.0 µm and an acid value ranging from 20 to 80. An aqueous metallic-base coating composition which enables to form a coating film of an improved appearance at a high workability almost free from "sagging" and "unevenness" is provided.

9 Claims, No Drawings

AQUEOUS COATING COMPOSITION

CROSS REFERENCE TO A RELATED APPLICATION

This is a continuation-in-part application of application Ser. No. 08/255,996 filed Jun. 8, 1994 now abandoned.

FIELD OF THE INVENTION

The present invention relates to an aqueous coating composition, especially to an aqueous metallic-base coating composition suitable for automobiles.

BACKGROUND OF THE INVENTION

To minimize bad influences on environments, aqueous paint has been intensely developed in the field of automobile coating instead of conventional solvent-based paint. But in general when a metallic-base paint containing aluminum pigment for automobiles are made aqueous, the aluminum pigment will not be oriented uniformly, which causes poor appearance.

To improve appearance finished by using an aqueous metallic paint, for example, a coating composition comprising a dispersion of particles which have carboxyl or sulfonic acid groups are produced by two-step emulsion polymerization, in Jap. Pat. Laid-Open Publication No. Sho 58-168664. But this coating composition, when coated on a vertical or slanting face, is like to generate so-called "sugging" which refers to a state of flow-down of the coating film before drying, and "unevenness" which refers to a convex part of the coating film caused by collection of flown coating composition, and as a result the productivity of the coating procedure may be reduced.

Jap. Pat. Laid-Open Publication No. Hei 4-25582 discloses an aqueous metallic-base coating composition containing both an amide group-containing aqueous acrylic resin and an urethane-containing aqueous dispersion, in order to improve appearance of the coated film, but there still exist problems in coating workability. Jap. Pat. Publication No. Hei 2-32947 discloses a process for preparing multiple coating layers of which viscosity is made controllable by using fine particles of crosslinked polymer. However, such a coating composition confronts with defects of practical workability because of its inappropriate fluidity as a coating liquid.

SUMMARY OF THE INVENTION

The object of the present invention is to provide an aqueous metallic-base coating composition which enables to form a coating film of an improved appearance at a high workability almost free from "sagging" and "unevenness".

The present invention provides an aqueous coating composition comprising: (A) 10 to 95% by weight (based on solid content) of a film forming polymer which is prepared by neutralizing at least a part of acid groups contained in a copolymer having a number average molecular weight ranging from 6,000 to 50,000 prepared by copolymerizing (A1) 5 to 40% by weight of an amide group-containing ethylenically unsaturated monomer, (A2) 3 to 15% by weight of an acid group-containing ethylenically unsaturated monomer, (A3) 10 to 40% by weight of a hydroxyl group-containing ethylenically unsaturated monomer, and (A4) a remainder amount of ethylenically unsaturated monomers other than the monomers (A1) to (A3); and (B) 5 to 90% by weight (based on solid content) of an aqueous dispersion of carboxyl group-containing acrylic resin particles having a particle size ranging from 0.01 to 1.0 μm and an acid value ranging from 20 to 80.

The term "ethylenically unsaturated monomer" in the present specification refers to an ethylenically unsaturated compound capable of radical polymerization.

The amide group-containing ethylenically unsaturated monomer (A1) used for preparing a film forming polymer (A) in the present invention, is (meth)acrylamide in general. Examples of such (meth)acrylamide include acrylamide, methacrylamide, N,N-dimethyl acrylamide, N,N-dimethyl methacrylamide, N,N-dibutyl acrylamide, N,N-dibutyl methacrylamide, N,N-dioctyl acrylamide, N,N-dioctyl methacrylamide, N-monobutyl acrylamide, N-monobutyl methacrylamide, N-monooctyl acrylamide, and N-monooctyl methacrylamide, etc. Preferred (meth)acrylamides among the above are acrylamide and methacrylamide.

An acid group of the acid group-containing ethylenically unsaturated monomer (A2) used for preparing a film forming polymer (A), is generally carboxyl group or sulfonic acid group.

Examples of the monomer (A2) include styrene derivatives (such as 3-vinyl salicylic acid, and 3-vinyl acetylsalicylic acid, etc.); (meth)acrylic acid derivatives (such as acrylic acid, methacrylic acid, crotonic acid, isocrotonic acid, acrylic acid dimer and α-hydro-ω-((1-oxo-2-propenyl)oxy)poly(oxy(1-oxo-1,6-hexanediyl)) which is prepared by adding ε-caprolactone to acrylic acid, etc.); and unsaturated dibasic acids, and half-esters, half-amides and half-thioesters thereof (such as maleic acid, fumaric acid, itaconic acid, and half-esters, half-amides and half-thioesters thereof, etc.).

Preferred alcohols for preparing half-esters of unsaturated dibasic acids are aliphatic alcohols having 1 to 12 carbon atoms. For example, methanol, ethanol, propanol, butanol, ethylene glycol monomethyl ether, ethylene glycol monoethyl ether, dimethyl aminoethanol, diethyl aminoethanol, acetol, allyl alcohol, and propargyl alcohol, etc., are preferably employed in the present invention. More Preferably, butanol, dimethyl aminoethanol, diethyl aminoethanol, acetol, allyl alcohol and propargyl alcohol are employed.

Preferred amines for preparing half-amides of unsaturated dibasic acids are aliphatic amines having 1 to 12 carbon atoms. Examples may include ethylamine, diethylamine, butylamine, dibutylamine, cyclohexylamine, aniline and naphthylamine, etc.

Preferred mercaptans for preparing half-thioesters of unsaturated dibasic acids are aliphatic mercaptans having 1 to 12 carbon atoms. Examples may include ethylmercaptan, propylmercaptan and butylmercaptan, etc.

The half-esterification, half-amidation or half-thioesterification is conducted according to the conventional processes within a temperature range of from room temperature to 120° C. and optionally in the presence of a tertiary amine catalyst. The monomer (A2) applicable in the present invention can be obtained as described above, but half-thioesters are defective in smell so that half-esters or half-amides are particularly preferred.

With respect to ethylenically unsaturated monomers having sulfonic acid group, p-vinyl benzene sulfonic acid and 2-acrylamide propane sulfonic acid, etc., may be exemplified.

Examples of the hydroxyl group-containing ethylenically unsaturated monomer (A3) used for preparing the present inventive film forming polymer (A), may include 2-hydroxyethyl acrylate; 2-hydroxyethyl methacrylate; 2-hydroxypropyl acrylate; 2-hydroxypropyl methacrylate; 4-hydrobutyl acrylate; 2,4-dihydroxy-4'-vinyl benzophenone; N-(2-hydroxyethyl)acrylamide; and N-(2-hydroxyethyl)methacrylamide, etc.

The other ethylenically unsaturated monomers (A4) than monomers (A1) to (A3) used for preparing the film forming polymer (A) in the present invention are ethylenically unsaturated compounds which are inactive to both acidic and hydroxyl groups and do not affect the polymerization. More specifically, there are (meth)acrylates (such as methyl acrylate, methyl methacrylate, ethyl acrylate, ethyl methacrylate, n-butyl acrylate, n-butyl methacrylate, isobutyl acrylate, t-butyl acrylate, 2-ethylhexyl acrylate, 2-ethylhexyl methacrylate, lauryl methacrylate, and phenyl acrylate, etc.); polymerizable aromatic compounds (such as styrene, α-methyl styrene, vinyl ketone, t-butyl styrene, parachlorostyrene, and vinyl naphthalene, etc.); polymerizable nitriles (such as acrylonitrile and methacrylonitrile, etc.); vinyl halides (such as vinyl chloride, vinyl bromide, and vinyl fluoride, etc.); α-olefins (such as ethylene, and propylene, etc.); vinyl esters (such as vinyl acetates and vinyl propionate, etc.); and dienes (such as butadiene and isoprene, etc.).

The monomers (A1) to (A4) are radically copolymerized to give a film forming polymer (A). The polymerization may be carried out according to the process commonly known in the art like radical polymerization in solution. For instance, such procedure may be exemplified that: at a polymerization temperature of 60° to 160° C., an appropriate radical polymerization initiator and a mixture solution of monomers are added to an appropriate solvent by dropping over 2 to 10 hours with stirring. The radical polymerization initiator applicable here is not limited particularly and may be those commonly employed in an ordinary radical polymerization, such as azoic compounds and peroxides, etc. Solvents used here are not limited especially so far as they do not affect the reaction, and alcohols, ketones and hydrocarbon solvents may be employed.

The monomer (A1) is used in amounts of from 5 to 40% by weight, preferably from 8 to 30% by weight. An amount less than 5% by weight may reduce orientation of the flaky metallic pigments, and poor appearance of the coated film may be provided. While an amount exceeding 40% by weight may result in poor water resistance of the coated film.

The monomer (A2) is used in amounts of from 3 to 15% by weight, preferably from 5 to 13% by weight. An amount less than 3% by weight may reduce water-dispersibility of the film forming polymer, while an amount beyond 15% by weight may cause a lowering of water resistance of the coated film.

The monomer (A3) is employed in amounts of from 10 to 40% by weight, preferably from 13 to 30% by weight. An amount less than 10% by weight may reduce the curability of the coating composition, while an amount exceeding 40% by weight may result in a lowering of water resistance of the coated film.

It is recommended to adjust the reaction conditions so as to get the number average molecular weight of the resultant copolymer of from 6,000 to 50,000, preferably from 8,000 to 30,000. A number average molecular weight less than 6,000 will result in insufficient workability and curability, while that of beyond 50,000 may cause a decrease in solid content at the time of coating, poor workability may be provided. Meanwhile the molecular weight in the present specification is determined according to GPC method.

For the purpose of controlling the molecular weight, chain transfer agents such as mercaptans like laurylmercaptan and α-methylstyrene dimer, may be used, if necessary.

Together with the film forming polymer (A) thus prepared, the present inventive aqueous coating composition employs an aqueous dispersion of carboxyl group-containing acrylic resin particles (B).

The preparation of an aqueous dispersion of carboxyl group-containing resin particles (B) is usually conducted by emulsion polymerization of (B1) a carboxyl group-containing ethylenically unsaturated monomer with (B2) ethylenically unsaturated monomer other than the monomer (B1).

The monomer (B1) applicable in the present invention, may include styrene derivatives, (meth)acrylic acid derivatives and unsaturated dibasic acids, etc. Derivatives of (meth)acrylic acid are preferably used, and acrylic acid, methacrylic acid, acrylic acid dimers and α-hydro-ω-((1-oxo-2-propenyl)oxy)poly(oxy(1-oxo-1,6-hexanediyl)) are more preferred.

The monomer (B2) used here, include ethylenically unsaturated compounds radical copolymerizable with carboxyl group-containing ethylenically unsaturated monomers (B1), and such may be exemplified as: (meth)acrylates having no reactive functional group (such as methyl acrylate, methyl methacrylate, ethyl acrylate, ethyl methacrylate, n-butyl acrylate, n-butyl methacrylate, isobutyl acrylate, t-butyl acrylate, 2-ethylhexyl acrylate, 2-ethylhexyl methacrylate, lauryl methacrylate, phenyl acrylate, isobornyl acrylate, isobornyl methacrylate, cyclohexyl methacrylate, t-butyl cyclohexyl acrylate, t-butyl cyclohexyl methacrylate, dicyclopentadienyl acrylate, dicyclopentadienyl methacrylate, dihydrodicyclopentadienyl acrylate, and dihydrodicyclopentadienyl methacrylate, etc.); polymerizable aromatic compounds (such as styrene, α-methyl styrene, vinyl ketone, t-butyl styrene, parachlorostyrene and vinyl naphthalene, etc.); hydroxyl group-containing unsaturated compounds (such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, and methacryl alcohol, etc.); polymerizable amides (such as acrylamide, methacrylamide, N-methylol methacrylamide, and N-methoxymethyl acrylamide, etc.), polymerizable nitriles (such as acrylonitrile and methacrylonitrile, etc.); vinyl halides (such as vinyl chloride, vinyl bromide and vinyl fluoride, etc.); α-olefins (such as ethylene, and propylene, etc.); vinyl esters (such as vinyl acetates and vinyl propionate, etc.); and dienes (such as butadiene and isoprene, etc.).

Also a compound having two or more ethylenically unsaturated group in its molecule may be employed as the monomer (B2) for the preparation of the present inventive aqueous dispersion of carboxyl group-containing resin particles. More specifically, there are such examples as polymerizable unsaturated monocarboxylic acid esters of polyhydric alcohol (such as ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, neopentyl glycol dimethacrylate, 1,6-hexanediol diacrylate, 1,6-hexanediol dimethacrylate, pentaerythritol diacrylate, pentaerythritol dimethacrylate, pentaerythritol triacrylate, pentaerythritol trimethacrylate, pentaerythritol tetraacrylate, pentaerythritol tetramethacrylate, glycerol diacrylate, glycerol dimethacrylate, glycerol acryloxy dimethacrylate, 1,1,1-trishydroxymethyl ethane diacrylate, 1,1,1-trishydroxymethyl ethane dimethacrylate, 1,1,1-trishydroxymethyl ethane triacrylate, 1,1,1-trishydroxymethyl ethane trimethacrylate, 1,1,1-trishydroxymethyl propane diacrylate, and 1,1,1-trishydroxymethyl propane dimethacrylate, etc.); polymerizable unsaturated alcohol esters of polybasic acid (such as diallyl terephthalate, diallyl phthalate, and triallyl trimellitate, etc.); aromatic compounds substituted by two or more vinyl groups (such as divinyl benzene, etc.); and addition products of epoxy group-containing ethylenically unsaturated monomer and carboxyl group-containing ethylenically unsaturated monomer (such as reaction products of glycidyl acrylate or glycidyl methacrylate with acrylic acid, methacrylic acid, crotonic acid, or maleic acid).

The monomer (B2) as described above may be used alone or in combination.

An amount of the monomer (B1) used for emulsion polymerization is from 3 to 50% by weight, preferably from 4 to 40% by weight. An amount of the monomer (B2) is from 97 to 50% by weight, preferably from 96 to 60% by weight. The amounts are on the basis of the total amount of the ethylenically unsaturated monomers used for preparing the aqueous dispersion of carboxyl group-containing resin particles (B).

Emulsion polymerization is carried out in such a way that: an emulsifier is dissolved in an aqueous medium containing water and if necessary organic solvents like alcohol, and to which an ethylenically unsaturated monomer and a polymerization initiator are added by dropping with stirring and heating. At this time ethylenically unsaturated monomer, which is previously emulsified in the presence of an emulsifier and water, may be added by dropping in the same way.

The polymerization initiators applicable preferably in the present invention, such may be exemplified as: organic solvent Soluble azoic compounds (such as azobisisobutylonitrile, 2,2'-azobis(2-methylbutylonitrile), and 2,2'-azobis(2,4-dimethylvaleronitrile), etc.), and water soluble azoic compounds (such as anion type, 4,4'-azobis (4-cyanovaleric acid) and cation type, 2,2'-azobis(2-methyl propionamidine)); and redox type organic solvent soluble peroxides (such as benzoyl peroxide, parachlorobenzoyl peroxide, lauroyl peroxide, and t-butyl perbenzoate, etc.), and water soluble peroxides (such as potassium persulfate and ammonium peroxide, etc.).

Emulsifiers those commonly employed may be applicable, and in particular, reactive emulsifiers such as "ANTOX MS-60" by Nippon Nyukazai, "AQUARON HS-10" by Daiichi Kogyo Seiyaku, and "ELEMINOL JS-2" by Sanyo Kasei Kogyo, are preferably used.

For the purpose of controlling the molecular weight, chain transfer agents such as mercaptans like laurylmercaptan and α-methylstyrene dimer, may be used, if necessary.

The reaction temperature is determined depending on the polymerization initiators employed and, for example, a temperature range from 60° to 90° C. for azoic compounds, while a range from 30° to 70° C. for redox type initiators are recommended. The reaction time is generally for 1 to 8 hours. The amount of initiators to be used is usually from 0.1 to 5% by weight based on the total amount of the unsaturated compounds, preferably from 0.5 to 2% by weight.

The particle size of carboxyl group-containing acrylic resin particles is preferably within a range from 0.01 to 1.0 μm. A particle size less than 0.01 μm does not improve workability, while that of exceeding 1.0 μm may result in poor appearance of the coated film. Control of particle size may be carried out according to the methods known to the arts, for example, by selecting the monomer components or varying amounts of the monomers.

The acid value of the aqueous dispersion of carboxyl group-containing acrylic resin particles (B) is within a range from 20 to 80, preferably from 20 to 70. An acid value lower than 20 does not improve workability, while a value beyond 80 may cause an increasing in water solubility to lose dispersibility of particles. The "acid value" of the present invention is defined based on an amount of the monomer (B1) employed, according to the arithmetic equation well known to those skilled in the art.

It is preferred that the aqueous dispersion of carboxyl group-containing acrylic resin particles (B) can be neutralized by a base to pH 5 to 10, because the aqueous dispersion (B) shows excellent stability such a pH region. The neutralization is carried out prior to or after the polymerization by adding preferably tertiary amines such as dimethylethanolamine and triethylamine, etc.

As has been described heretofore, thus prepared film forming polymer (A) and the aqueous dispersion of carboxyl group-containing resin particles (B) are mixed together to give the present inventive aqueous coating composition. The mixing method may not be limited particularly and may be those well known to those skilled in the arts.

The mixing amount of the polymer (A) is 95 to 10% by weight preferably from 95 to 40% by weight on the basis of the total amount of the film forming polymer (A) and the aqueous dispersion of carboxyl group-containing resin particles (B). The mixing amount of the polymer (B) is 5 to 90% by weight preferably from 5 to 60% by weight. If an amount of the aqueous dispersion of carboxyl group-containing resin particles (B) is less than 5% by weight, "sagging" may not sufficiently be prevented and poor appearance of the coated film may be provided. If the amount is more than 90% by weight, the film forming ability of the resulting coating composition may become poor.

The present inventive aqueous coating composition is applicable to various purposes and in general it is used as an aqueous coating composition having a curability by mixing crosslinking agents. An example of applicable crosslinking agents is melamine resin. Water soluble melamine resin may be used advantageously and, for instance, there are commercially available "CYMEL-303" by Mitsui Toatsu and "SUMIMARL N-W" by Sumitomo Kagaku Kogyo. However the type is not limited especially and water insoluble melamine resin is also applicable.

The amount of melamine resin to be used is recommended within 20 to 100% by weight based on the solid content of the film forming polymer (A). An amount less than 20% by weight may result in an insufficient curability, while exceeding 100% by weight may make the coated film hard and brittle.

In addition, the present inventive aqueous coating composition may be mixed generally by metallic pigments such as aluminum pigment, bronze pigment, mica, gold pigment and silver pigment, etc. The amount of metallic pigments may preferably be from 2 to 100 parts by weight based on 100 parts by weight of the aqueous coating composition (based on solid content). If necessary, the present inventive aqueous coating composition may further include various additives (such as UV absorbent, defoaming agent and surface treating agents, etc.), conventional inorganic pigments or organic pigments.

Examples of the inorganic pigment include Carbon Black, titanium oxide and Mapico Yellow. Examples of the organic pigment include Quinacridone, copper Phthalocyanine Blue and copper Phthalocyanine Green.

For the purpose of improving water resistance and chipping resistance, the present inventive aqueous coating composition may include an aqueous dispersion containing urethane. For instance, Jap. Pat. Laid-Open Publication No. Hei 4-25582 discloses an aqueous dispersion of an oligomer containing a hydrophilic group which is prepared by: reacting diol of a molecular weight of 100 to 5,000 having terminal hydroxyl groups; diisocyanate; and a compound having at least one active hydrogen and a hydrophilic group within its molecule, under an isocyanate-excess condition; and dispersing it in an aqueous medium containing primary and/or secondary polyamine. An amount of the urethane-containing aqueous dispersion to be added is preferably from 5 to 90% by weight based on 100 parts by weight of the aqueous coating composition (based on solid content). If an amount of the dispersion is less than 5% by weight, water resistance and chipping resistance of the coated film may not sufficiently be improved. If an amount of the dispersion is more than 90% by weight, the curability of the resulting coating composition may become poor.

A high quality metallic coated film can be obtained by such a coating process that: coating a base coating composition prepared by mixing the present inventive aqueous coating composition with a metallic pigment, on the surface of the substrate; applying a clear coating composition without crosslinking procedure; and then crosslinking the base coat together with the clear coat simultaneously, namely, by so-called wet-on-wet process. Clear coating compositions preferably employed may include solvent type or powder type clear coatings. Preferred examples of solvent type clear coatings include acrylic-melamine type, acrylic-isocyanate type, and polyol-epoxy-anhydride half-ester type clear coating compositions.

As a powder type clear coating composition, conventional powder coating compositions such as thermoplastic and thermosetting powder coating compositions, may be used. The thermosetting powder coating compositions are desirable especially, because such a coatings provides excellent physical properties. More specifically, there are epoxy, acrylic and polyester powder coating compositions and acrylic powder coating compositions are particularly recommended because of its excellent weather resistance.

In general acrylic powder coating composition contains a principal component comprising a functional acrylic polymer, and a crosslinking agent thereof. The functional acrylic polymer is prepared by copolymerizing a vinyl monomer having a functional group with copolymerizable monomers other than the vinyl monomer having a functional group. Monomers employed are not particularly limited and may be those commonly known to those skilled in the art. For example, functional acrylic polymers can be prepared through the common processes, using vinyl monomers having a functional group such as glycidyl (meth)acrylate, methylglycidyl (meth)acrylate, hydroxyethyl (meth) acrylate, hydroxybutyl (meth)acrylate, acrylic acid and methacrylic acid.

The crosslinking agents are not particularly limited and may be those commonly known as being capable of crosslinking the principal component, such as, for example, polycarboxylic acid, phenol, amine, blocked isocyanate, blocked isocyanate containing urethodione group, alkoxyalkyl glycol allyl epoxy compound, and hydroxyalkylamide compound.

The most preferable powder clear coating composition applicable in the present invention, is those of epoxy-containing acrylic resin/polycarboxylic acid type, because such a coating composition generates few volatiles at the time of crosslinking, and provides improved appearance and reduces yellowing.

According to the present invention, the aqueous coating composition can be provided with an optimal viscosity suitable for coating procedure by an interaction between amide groups of the film forming polymer and carboxyl groups of the resin particles. In other words, when the aqueous coating composition according to the present invention is subjected to a strong shear force at the time of spray-coating, for example, interactions between the functional groups are cut to lower the viscosity. However, once that the coating composition is applied to the material to be coated and the shear force is removed, then the interactions between the functional groups will restore rapidly to elevate the viscosity, thereby so-called "sagging" and "unevenness" become difficult to occur. Thus by prohibiting the occurrence of "sagging" and "unevenness" a flat and highly metallic appearance can be attained. Further amide group present in the composition can not only give the resultant composition with hydrophilic property but also can improve the aggregation of resin and the dispersion of metallic pigment, which contributes to the good appearance.

Next the present invention will be explained in detail below with reference to examples but the scope of the invention is not limited by them. Meanwhile "parts" in the Examples means "parts by weight" unless otherwise specified.

EXAMPLES

Preparative Example 1

Preparation of film forming polymer 1

76 parts of ethylene glycol monobutyl ether were fed in a reaction vessel of 1 L equipped with a nitrogen introducing tube, a stirrer, a thermoregulator and a cooling tube. Separately, a monomer solution was prepared by mixing 15 parts of styrene, 63 parts of methyl methacrylate, 48 parts of 2-hydroxyethyl methacrylate, 117 parts of n-butyl acrylate, 27 parts of methacrylic acid, 30 parts of acrylamide, and 3 parts of azobisisobutylonitrile, together. 61 parts of thus prepared monomer solution were added to the reaction vessel previously prepared. The resultant mixture was heated to 120° C. with stirring, to which 245 parts of the monomer solution were further added over 3 hours, followed by stirring for one hour. Thereafter, 28 parts of dimethylethanolamine and 200 parts of deionized water were added to the mixture to obtain an acrylic resin varnish containing a solid content of 50%, with the resin having a number average molecular weight of 12,000, an OH value of 70 and an acid value of 58.

Preparative Example 2

Preparation of film forming polymer 2

500 parts of 2-ethoxypropanol were fed in a reaction vessel of 3 L equipped with a nitrogen introducing tube, a stirrer, a thermoregulator, a dropping funnel and a decanter, and were heated to 100° C. Separately, 50 parts of styrene, 50 parts of methyl methacrylate, 200 parts of 2-hydroxyethyl methacrylate, 120 parts of 2-ethylhexyl methacrylate, 380 parts of n-butyl acrylate, 100 parts of monobutyl maleate dissolved in 300 parts of methanol, 100 parts of acrylamide, and 30 parts of azobisisobutylonitrile serving as a polymerization initiator, were all fed in a dropping funnel to prepare a monomer solution. While maintaining the temperature within the reaction vessel at 100° C., the monomer solution was dropped to the vessel with removal of methanol using the decanter, over 3 hours. After stirring of further 30 minutes a solution of polymerization initiator consisting of 50 parts of butyl acetate and 3 parts of t-butylperoxy-2-ethylhexanoate was dropped thereto over 30 minutes. While maintaining at 100° C. for further 1.5 hours from the dropping, 100 parts of methanol were removed. Thereafter the solvents of 220 parts were removed under reduced pressure. To the resultant was further added 100 parts of dimethylethanolamine and 570 parts of deionized water and was dissolved well to give a transparent viscose acrylic resin varnish having a solid content of 50%, with the resin having a number average molecular weight of 10,000.

Preparative Example 3

Preparation of film forming polymer 3

An acrylic resin varnish was prepared in the same way as in preparative example 1 except that 45 parts of styrene were used instead of acrylamide.

Preparative Example 4

Preparation of aluminum pigment/melamine dispersion paste

To 15 parts of aluminum pigment paste (trade name: ALPASTE 7160N; aluminum content of 65%, by Toyo Aluminum) were added 30 parts of CYMEL 303 (methylated methylolmelamine, by Mitsui Toatsu), and were mixed homogeneously. To the resultant was further added 2 parts of isostearic acid phosphate (trade name: PHOSREX A-180L, by Sakai Kagaku), and was mixed homogeneously to give an aluminum pigment dispersion paste.

Preparative Example 5

Preparation of clear coating composition 1

(1) Preparation of varnish 70 parts of xylene and 20 parts of n-butanol were fed in a reaction vessel equipped with a nitrogen introducing tube, a stirrer, a thermoregulator and a cooling tube. Separately, 1.2 parts of methacrylic acid, 26.4 parts of styrene, 26.4 parts of methyl methacrylate, 36.0 parts of n-butyl acrylate, 10.0 parts of 2-hydroxyethyl methacrylate, and 1.0 part of azobisisobutylonitrile were blended together to give a monomer solution. 20 parts of thus obtained monomer solution were added to the reaction vessel previously prepared. The resultant was heated with stirring and while refluxing, the remaining 81.0 parts of the monomer solution were added thereto by dropping over 2 hours. Then a polymerization initiator solution consisting of 0.3 parts of azobisisobutylonitrile and 10 parts of xylene, was further added by dropping over 30 minutes. The resultant solution was stirred with refluxing for further 2 hours to stop the reaction and an acrylic resin varnish having a solid content of 50%, with the resin having a number average molecular weight of 8,000 and an OH value of 48.

(2) Preparation of polyester resin 134 parts of bishydroxyethyl taurine, 130 parts of neopentyl glycol, 236 parts of azelaic acid, 186 parts of phthalic anhydride, and 27 parts of xylene were fed in a reaction vessel of 2 L equipped with a nitrogen introducing tube, a stirrer, a thermoregulator, a condenser and a decanter, and the temperature was raised. Water generated from the reaction was azeotropically removed together with xylene. The temperature was raised to 190° C. over about 2 hours from starting the reflux and the stirring and dehydration were continued until an acid value became 145 which corresponds to that of carboxylic acid. Then the resultant was cooled to 140° C. and 314 parts of CARJULA E10 (glycidyl ester of versatic acid, by Shell) was added by dropping over 30 minutes while maintaining at 140° C. The resultant was allowed to react for 2 hours with stirring to terminate the reaction. Thus obtained polyester resin had a number average molecular weight of 1054, an acid value of 59 and an OH value of 90.

(3) Preparation of resin particles 10 parts of the polyester resin obtained by the Preparation (2) and 0.75 parts of dimethylethanolamine, together with 282 parts of deionized water were fed in a reaction vessel of 1 L equipped with a nitrogen introducing tube, a stirrer, a cooler and a thermoregulator, and were dissolved with stirring at a temperature of 80° C. To the resultant was added a polymerization initiator containing 45 parts of azobis cyanovaleric acid, 45 parts of deionized water and 4.3 parts of dimethylethanolamine, to which a monomer solution comprising 70.7 parts of methyl methacrylate, 94.2 parts of n-butyl acrylate, 70.7 parts of styrene, 30 parts of 2-hydroxyethyl acrylate, and 4.5 parts of ethylene glycol dimethacrylate, was further added by dropping over one hour. Thereafter an polymerization initiator solution prepared by dissolving 1.5 parts of azobis cyanovaleric acid in 15 parts of deionized water and 1.4 parts of dimethylethanolamine, was added thereto followed by stirring at 80° C. for one hour, to give an emulsion having a solid content of 45%, a pH value of 7.2, a viscosity of 92 cps (at 25° C.) and a particle size of 0.156 µm. Thus obtained emulsion was spray-dried to remove moisture and to the resultant resin particles were added xylene in a ratio of 200 parts based on 100 parts of the resin particles to disperse. Thus yielded dispersion of the resin particles in xylene showed a particle size of 0.3 µm.

(4) Preparation of clear coating composition 100 parts of varnish obtained by Preparation (1), 36 parts of "U-VAN 20SE-60" (butylated melamine resin, by Mitsui Toatsu), 0.5 parts of "MODAFLOW" (a surface conditioner, by Monsanto) and 2.2 parts of the resin particles yielded by Preparation (3) were taken in a stainless steel container and were subjected to stirring by means of a laboratory stirrer to produce a clear coating composition.

Preparative Example 6

Preparation of clear coating composition 2

(1) Preparation of varnish 57 parts of xylene and 6 parts of n-butanol were fed in the same vessel as used in (1) of preparative example 5. Separately, 30.0 parts of styrene, 45.2 parts of 2-ethylhexyl methacrylate, 5.5 parts of 2-ethylhexyl acrylate, 16.2 parts of 2-hydroxyethyl methacrylate, 3.1 parts of methacrylic acid and 4.0 parts of azobisisobutylonitrile were blended together to prepare a monomer solution. 20 parts of thus obtained monomer solution were added to the reaction vessel previously prepared, and were heated with stirring. While refluxing, the remaining 84 parts of the monomer solution were added thereto by dropping over 2 hours and thereafter a polymerization initiator comprising 0.5 parts of azobisisobutylonitrile, 23 parts of xylene, and 14 parts of n-butanol, was further added by dropping over 20 minutes. The resultant was stirred for further 2 hours with refluxing to terminate the reaction and thus an acrylic resin varnish containing a solid content of 50% with the resin having a number average molecular weight of 3400 and an OH value of 70, was obtained.

(2) Preparation of clear coating composition 100 parts of the varnish obtained by the above Preparation (1) and 16.7 parts of "DESMODULE N-75" (isocyanurate resin, by Sumitomo Bayer) were taken in a stainless steel container and were stirred by means of a laboratory stirrer to yield a clear coating composition.

Preparative Example 7

Preparation of clear coating composition 3

(1) Preparation of varnish 500 parts of butyl acetate were fed in a reaction vessel of 2 L equipped with a nitrogen introducing tube, a stirrer, a cooler, a thermoregulator and a dropping funnel, and were heated to 125° C. 50 parts of styrene, 400 parts of glycidyl methacrylate, 350 parts of 2-hydroxyethyl methacrylate, 200 parts of 2-ethylhexyl acrylate, and 70 parts of t-butylperoxy-2-ethylhexanoate, were fed in the dropping funnel to yield a monomer solution, which was added by dropping to the reaction vessel previously prepared, over 3 hours. The temperature was kept at 125° C. for 30 minutes from the termination of the dropping. To the resultant was added a polymerization initiator solution comprising 10 parts of t-butylperoxy-2-ethylhexanoate and 250 parts of xylene, by dropping over 30 minutes and was allowed to react at 125° C. for further 2 hours from the dropping termination. Thus an acrylic resin varnish 1 containing a solid content of 59% with the resin having a number average molecular weight of 4,000, was obtained.

(2) Preparation of polymer containing carboxylic acid anhydride group 80 parts of xylene was fed in a reaction vessel of 1 L equipped with a nitrogen introducing tube, a stirrer, a cooler, a thermoregulator and a dropping funnel and were heated to 115° C. A monomer solution comprising 25 parts of styrene, 21 parts of n-butyl acrylate, 95 parts of n-butyl methacrylate, 34 parts of 2-ethylhexyl methacrylate, 50 parts of itaconic anhydride, 100 parts of propylene glycol monomethylether acetate, and 10 parts of t-butylperoxy-2-ethylhexanoate, was added to the reaction vessel by dropping over 3 hours. Then the resultant was stirred for 2 hours to give a polymer having carboxylic acid anhydride group, which contained a solid content of 53% and had a number average molecular weight of 5500.

(3) Preparation of half-esterified polymer

To 385 part of carboxylic acid anhydride group-containing polymer obtained by the above Preparation (2), were added 1.35 parts of triethylamine which were dissolved in 35 parts of butyl acetate, and 18.2 parts of methanol. The resultant was allowed to react at 40° C. for 12 hours. When the disappearance of absorption (1785 cm$^{-1}$) of anhydride group was confirmed by IR then the half-esterified polymer was yielded.

(4) Preparation of clear coating composition 100 parts of varnish obtained by Preparation (1), 133.0 parts of carboxylic acid anhydride group-containing polymer obtained by Preparation (3), 0.3 parts of tetrabutyl ammonium bromide, 1.2 parts of "TINUVIN-900" (benzotriazole type UV absorbent, by Ciba Geigy), and 0.6 parts of "SANOLE LS-292" (hindered amine type photostabilizer, by Sankyo) were fed in a stainless steel container and were stirred by a laboratory stirrer to give a clear coating composition. The resultant coating composition was diluted by a thinner consisting of butyl acetate/xylene=1/1, to an appropriate viscosity as a coating composition.

Preparative Example 8

Preparation of emulsion 1

185 parts of deionized water were fed in reaction vessel of 500 ml equipped with a nitrogen introducing tube, a stirrer, a cooler, a thermoregulator, and a dropping funnel, and were heated to 83° C. 20 parts of "ARONIX M-5300" (α-hydro-ω-((1-oxo-2-propenyl)oxy)poly(oxy(1-oxo-1,6-hexanediyl)), by Toa Goseikagaku), 5.9 parts of dimethylethanolamine, and 80 parts of styrene were fed in a dropping funnel to prepare a monomer solution, which was added to the reaction vessel by dropping over 2 hours. Simultaneously, a polymerization initiator solution prepared by neutralizing 1 part of 4,4'-azobis-4-cyanovaleric acid with 0.55 parts of dimethylethanolamine followed by dissolution into 40 parts of deionized water, was added by dropping to the reaction solution. The resultant was stirred for further one hour at 83° C. followed by cooling to give a milky white emulsion. The resultant emulsion had a solid content of 30% and a particle size of 100 nm (measured by laser beam scattering method).

Preparative Example 9

Preparation of emulsion 2

A milky white emulsion was prepared in the same manner as in preparative example 8 except that the initially fed deionized water was used in amounts of 197 parts and to the monomeric mixture was added 5.6 parts of reactive emulsifier "ANTOX MS-60" (methacrylate containing polyoxyethylene unit and sulfonate group, by Nippon Nyukazai). The resultant emulsion contained a solid content of 30% and had a particle size of 94 nm (measured by laser beam scattering method).

Preparative Example 10

Preparation of emulsion 3

165 parts of deionized water were fed in the same vessel as used in preparative example 8 and were heated to 83° C. 20 parts of "ARONIX M-5300", 5.9 parts of dimethylethanolamine, and 70 parts of styrene were fed in a dropping funnel to prepare a monomer solution. Separately, a solution prepared by dissolving 10 parts of acrylamide in 20 parts of deionized water was fed in a separate dropping funnel. Both monomer solutions were respectively added by dropping to the reaction vessel previously prepared, over 2 hours respectively. Simultaneously a polymerization initiator solution prepared by neutralizing 1.0 part of 4,4'-azobis-4-cyanovaleric acid with 0.55 parts of dimethylethanolamine followed by dissolving in 40 parts of deionized water, was also added by dropping to the reaction vessel. The resultant was stirred at 83° C. for further one hour and then was cooled to give a milky white emulsion. The resultant emulsion contained a solid content of 30% and had a particle size of 95 nm (measured by laser beam scattering method).

Preparative Example 11

Preparation of emulsion 4

180 parts of deionized water, 10 parts of styrene, 0.7 parts of methacrylic acid, and 0.7 parts of dimethylethanolamine were fed in the same vessel as used in preparative example 8 and were heated to 83° C. The polymerization initiator was prepared by neutralizing 0.5 parts of 4,4'-azobis-4-cyanovaleric acid with 0.27 parts of dimethylethanolamine followed by dissolving in 5 parts of deionized water, and it was added by dropping to the vessel over 20 minutes. Then a monomer solution comprising 84.3 parts of styrene, 5 parts of methacrylic acid, and 5 parts of dimethylethanolamine, and a polymerization initiator solution prepared by neutralizing 0.5 parts of 4,4'-azobis-4-cyanovaleric acid with 0.27 parts of dimethylethanolamine followed by dissolving in 40 parts of deionized water, were further added to the vessel by dropping over 2 hours. The resultant was stirred for further one hour to yield a white emulsion, which had a solid content of 30% and a particle size of 330 nm (measured by laser beam scattering method).

Preparative Example 12

Preparation of emulsion 5

187 parts of deionized water, 10 parts of styrene, and 0.7 parts of methacrylic acid were fed in the same reaction vessel as used in preparative example 8, and were heated to 83° C. A polymerization initiator solution prepared by dissolving 0.5 parts of ammonium persulfate in 5 parts of deionized water, was added dropping to the vessel previously prepared, over 20 minutes. Thereafter a monomer solution comprising 84.3 parts of styrene and 5 parts of methacrylic acid, and a polymerization initiator solution prepared by dissolving 0.5 parts of ammonium persulfate in 40 parts of deionized water, were further added dropping to the vessel over 2 hours. The resultant was stirred for further one hour to give a white emulsion. By adding dimethylethanolamine to the emulsion, pH was controlled to 8. The emulsion had a solid content of 30% and a particle size of 510 nm (measured by laser beam scattering method).

Preparative Example 13

Preparation of emulsion 6

A milky white emulsion was prepared in the same manner as in preparative example 8 except that 20 parts of mono-2-ethylhexyl maleate were employed instead of 20 parts of "ARONIX M-5300". The resultant emulsion had a solid content of 30% and a particle size of 150 nm (measured by laser beam scattering method).

Preparative Example 14

Preparation of emulsion 7

167 parts of deionized water, 10 parts of styrene, and 0.7 parts of methacrylic acid were fed in the same reaction vessel as used in preparative example 8, and were heated to 83° C. A polymerization initiator solution prepared by dissolving 0.5 parts of ammonium persulfate in 5 parts of deionized water, was added dropping to the vessel thus prepared, over 20 minutes. Thereafter a mixture comprising 74.3 parts of styrene and 5 parts of methacrylic acid, a monomer solution prepared by dissolving 10 parts of acrylamide in 20 parts of deionized water, and a polymerization initiator solution prepared by dissolving 0.5 parts of ammonium persulfate in 40 parts of deionized water, were added to the vessel respectively by dropping over 2 hours. The resultant was stirred for further one hour to give a white emulsion. By adding dimethylethanolamine to the emulsion, pH was controlled to 8. The emulsion had a solid content of 30% and a particle size of 500 nm (measured by laser beam scattering method).

Preparative Example 15

Preparation of urethane group-containing aqueous dispersion (1) Preparation of urethane prepolymer 40.2 parts of dimethylol propionic acid, 30 parts of triethylamine, and 312 parts of N-methyl pyrrolidone were fed in a reaction vessel of 1 L equipped with a nitrogen introducing tube, a stirrer, a cooler and a thermoregulator, and were heated to 90° C. 290 parts of isophorone diisocyanate and 700 parts of polypropylene glycol (molecular weight of 1,000) were added thereto and after stirring for 10 minutes, 1.03 parts of dibutyltin dilaurate were further added. The resultant was heated to 95° C. and was allowed to react for one hour.

(2) Preparation of aqueous dispersion 1757 parts of deionized water and 9.2 parts of hydrazine hydrate were fed in a reaction vessel of 5 L equipped with a nitrogen introducing tube, a stirrer, a cooler, a thermoregulator and a dropping funnel, and the urethane prepolymer solution prepared by (1) above, were added with stirring. The resultant was stirred for further 30 minutes to give a milky white, stable aqueous dispersion. The resultant aqueous dispersion had a solid content of 33% with an acid value based on the solid content being 16.2.

Preparative Example 16

Preparation of emulsion 8

A milky white emulsion was prepared in the same manner as in preparative example 8 except that in preparing the monomer solution the styrene amount was changed to 60 parts and 20 parts of ethylene glycol dimethacrylate were further added. The resultant emulsion had a solid content of 30% and a particle size of 95 nm (measured by laser beam scattering method).

Preparative Example 17

Preparation of emulsion 9

165 parts of deionized water and 0.3 parts of "ANTOX MS-60" were fed in the same vessel as used in preparative example 8, and were heated to 83° C. 5.6 parts of methacrylic acid, 42.2 parts of styrene, and 42.2 parts of isobornyl acrylate were fed in a dropping funnel to prepare a monomer solution, which was added dropwise to the reaction vessel over 2 hours. Simultaneously, a polymerization initiator solution which was separately prepared by dissolving 0.5 parts of ammonium persulfate in 40 parts of deionized water, was added dropwise to the vessel.

The resultant was stirred at 83° C. for further one hour and then was cooled to give a milky white emulsion. The pH value of the resultant emulsion was adjusted to 8 by adding dimethylaminoethanolamine. The emulsion had a solid content of 30% and a particle size of 280 nm (measured by laser beam scattering method).

Preparative Example 18

Preparation of clear coating composition (powder type)

(1) Preparation of acrylic resin 63 parts of xylene were fed in a flask equipped with a dropping funnel, a stirrer and a thermometer, and were heated to 130° C. Then 20 parts of styrene, 27 parts of methyl methacrylate, 45 parts of glycidyl methacrylate, 8 parts of isobutyl methacrylate, and 7.5 parts of t-butylperoxy-2-ethylhexyl hexanoate were fed in a dropping funnel to prepare a monomer solution. Thus obtained monomer solution was added to the flask previously prepared, by dropping at a constant rate over 3 hours.

The resultant was stirred for further 30 minutes from the termination of the dropping while maintaining the temperature. Thereafter a polymerization initiator solution comprising 7 parts of xylene and 0.1 part of t-butylperoxy-2- ethylhexyl hexanoate, was further added thereto by means of a dropping funnel at a constant rate. The resultant was stirred for further one hour from the termination of the dropping while maintaining the temperature and then was subjected to removal of xylene under reduced pressure to give a solid acrylic resin.

(2) Preparation of clear coating composition 70 parts of the above obtained acrylic resin, 19.1 parts of decane dicarboxylic acid, 0.11 parts of CF-1056 (methyl phenyl silicone, by TORAY DOW SILICONE), and 0.89 parts of benzoin were fed in a henshell mixer (by Mitsui-Miike Seisakusho) and were dry-blended, followed by fused-dispersing at 100° C. by means of "CO-KNEADER PR-46" (by Buss, Switzerland). The resultant was cooled and ground by a hammer mill and was subjected to a classification by means of 150-mesh wire gauze to give an epoxy-containing acrylic powder coating composition.

Example 1

To 112 parts of the film forming polymer prepared in preparative example 1 were added 47 parts of aluminum pigment/melamine dispersion paste prepared in preparative example 4, and were dispersed homogeneously. To the resultant was further added 47 parts of the emulsion prepared in preparative example 8 and was dispersed homogeneously to give an aqueous metallic-base coating composition.

Examples 2 to 12 and Comparative Examples 1 to 3

Using the same mixing ratio and the same process as in Example 1, constituents were respectively mixed as shown in Table 1 below, to obtain the corresponding aqueous metallic-base coating compositions, respectively.

TABLE 1

| Examples & Comparative Examples | Emulsified composition | Resin for metallic coating | Aluminum/melamine dispersion paste |
|---|---|---|---|
| Ex. 1 | P. Ex. 8 | P. Ex. 1 | P. Ex. 4 |
| Ex. 2 | P. Ex. 9 | P. Ex. 1 | P. Ex. 4 |
| Ex. 3 | P. Ex. 10 | P. Ex. 1 | P. Ex. 4 |
| Ex. 4 | P. Ex. 11 | P. Ex. 1 | P. Ex. 4 |
| Ex. 5 | P. Ex. 12 | P. Ex. 1 | P. Ex. 4 |
| Ex. 6 | P. Ex. 13 | P. Ex. 1 | P. Ex. 4 |
| Ex. 7 | P. Ex. 14 | P. Ex. 1 | P. Ex. 4 |
| Ex. 8 | P. Ex. 8 | P. Ex. 2 | P. Ex. 4 |
| Ex. 9 | P. Ex. 11 | P. Ex. 2 | P. Ex. 4 |
| Ex. 10 | P. Ex. 13 | P. Ex. 2 | P. Ex. 4 |
| Ex. 11 | P. Ex. 16 | P. Ex. 1 | P. Ex. 4 |
| Ex. 12 | P. Ex. 17 | P. Ex. 1 | P. Ex. 4 |
| C. Ex. 1 | — | P. Ex. 1 | P. Ex. 4 |

TABLE 1-continued

| Examples & Comparative Examples | Emulsified composition | Resin for metallic coating | Aluminum/melamine dispersion paste |
|---|---|---|---|
| C. Ex. 2 | — | P. Ex. 2 | P. Ex. 4 |
| C. Ex. 3 | P. Ex. 8 | P. Ex. 3 | P. Ex. 4 |

Ex.: Example
P. Ex.: Preparative example
C. Ex.: Comparative example

Example 13

To the coating composition obtained in Example 1 was added to 43 parts of urethane emulsion prepared in preparative example 15 to give an aqueous metallic-base coating composition.

Comparative Example 4

To the coating composition prepared in Comparative Example 1 was added 43 parts of urethane emulsion prepared in preparative example 15 to give an aqueous metallic-base coating composition.

Examples 14 to 28 and Comparative Examples 5 to 8

Aqueous metallic-base coating compositions prepared in Examples 1 to 13 and Comparative Examples 1 to 4, were respectively coated in an environment of a temperature of 23° C. and a humidity of 85%, by air-spraying onto an intercoated steel panels, placed vertically, in a thickness to give 20 μm after drying. Then clear coating compositions prepared in Preparative Examples 5 to 7 were respectively coated thereon in the same environment in a thickness to give 30 μm after drying. At this time the coating procedure was conducted in such a way that: the former was coated by two-stage method with an interval of one minute therebetween and then two-minute preheating was carried out at 80° C., thereafter the latter, clear coating composition, was coated thereon by one-stage method in a wet-on-wet style, followed by a setting for 7 minutes. Thus coated steel panels were baked at 140° C. for 30 minutes by means of a drier to obtain test panels of No. 1 to 19. The workability (sagging) and appearance (unevenness and metallic feeling) of thus obtained test panels were evaluated upon visual inspection respectively, of which results are shown in Table 2. The intercoated steel panels used, were prepared by electrodepositing an automobile coating composition onto a polished mild steel panel treated by chemical coating for degreasing, and then by primer coating thereon.

TABLE 2

| Examples & Comparative Examples | Test panel No. | Aqueous metallic coating | Clear coating | Workability Sagging | Appearance | |
|---|---|---|---|---|---|---|
| | | | | | Unevenness | Metallic feeling |
| Ex. 14 | 1 | Ex. 1 | P. Ex. 5 | ○ | ○ | ○ |
| Ex. 15 | 2 | Ex. 2 | P. Ex. 5 | ○ | ○ | ○ |
| Ex. 16 | 3 | Ex. 3 | P. Ex. 5 | ○ | ○ | ○ |
| Ex. 17 | 4 | Ex. 4 | P. Ex. 5 | ○ | ○ | ○ |
| Ex. 18 | 5 | Ex. 5 | P. Ex. 5 | ○ | ○ | ○ |
| Ex. 19 | 6 | Ex. 6 | P. Ex. 5 | ○ | ○ | ○ |
| Ex. 20 | 7 | Ex. 7 | P. Ex. 5 | ○ | ○ | ○ |

TABLE 2-continued

| Examples & Comparative Examples | Test panel No. | Aqueous metallic coating | Clear coating | Workability Sagging | Appearance Uneven-ness | Appearance Metallic feeling |
| --- | --- | --- | --- | --- | --- | --- |
| Ex. 21 | 8 | Ex. 8 | P. Ex. 5 | ○ | ○ | ○ |
| Ex. 22 | 9 | Ex. 9 | P. Ex. 5 | ○ | ○ | ○ |
| Ex. 23 | 10 | Ex. 10 | P. Ex; 5 | ○ | ○ | ○ |
| Ex. 24 | 11 | Ex. 11 | P. Ex. 5 | ○ | ○ | ○ |
| Ex. 25 | 12 | Ex. 12 | P. Ex. 5 | ○ | ○ | ○ |
| Ex. 26 | 13 | Ex. 13 | P. Ex. 5 | ○ | ○ | ○ |
| Ex. 27 | 14 | Ex. 1 | P. Ex. 6 | ○ | ○ | ○ |
| Ex. 28 | 15 | Ex. 1 | P. Ex. 7 | ○ | ○ | ○ |
| C. Ex. 5 | 16 | C. Ex. 1 | P. Ex. 5 | Δ~X | X | Δ~X |
| C. Ex. 6 | 17 | C. Ex. 2 | P. Ex. 5 | Δ~X | X | Δ~X |
| C. Ex. 7 | 18 | C. Ex. 3 | P. Ex. 5 | X | Δ~X | X |
| C. Ex. 8 | 19 | C. Ex. 4 | P. Ex. 5 | Δ | Δ | X |

Ex.: Example
P. Ex.: Preparative example
C. Ex.: Comparative example
Criteria of evaluation upon visual inspection
Sagging ○: none; Δ: slightly occurred; X : occurred
Unevenness ○: none; Δ: slightly occurred; X : occurred
Metallic feeling ○: excellent; Δ: ordinary; X : poor

Examples 29 to 33 and Comparative Examples 9 to 12

Aqueous metallic-base coating compositions prepared in Examples and Comparative Examples as listed in the following Table 3, were respectively coated in an environment of a temperature of 23° C. and a humidity of 85%, by air-spraying onto an intercoated steel panels, placed vertically, in a thickness to give 20 μm after drying. Then the powder clear coating composition prepared in Preparative Example 18 was respectively coated thereon in a thickness to give 80 μm after drying. At this time the coating procedure was carried out in such a manner that: the former was coated by two-stage method with an interval of one minute therebetween and then 5-minute preheating was conducted at 80° C., thereafter the latter, powder clear coating composition, was electrostatically coated thereon in a wet-on-wet style. Thus coated panels were subjected to baking at 150° C. for 30 minutes by means of a drier to obtain test panels of No. 20 to 28. The workability (sagging) and appearance (unevenness and metallic feeling) of thus obtained test panels were evaluated upon visual inspection respectively, of which results are shown in Table 3. The intercoated steel panels were prepared by electrodepositing an automobile coating composition onto a polished mild steel panel treated by chemical coating for degreasing, and then by primer-coating thereon.

TABLE 3

| Examples & Comparative Examples | Test panel No. | Aqueous metallic coating | Clear coating | Workability Sagging | Appearance Uneven-ness | Appearance Metallic feeling |
| --- | --- | --- | --- | --- | --- | --- |
| Ex. 29 | 20 | Ex. 1 | P. Ex. 18 | ○ | ○ | ○ |
| Ex. 30 | 21 | Ex. 3 | P. Ex. 18 | ○ | ○ | ○ |
| Ex. 31 | 22 | Ex. 6 | P. Ex. 18 | ○ | ○ | ○ |
| Ex. 32 | 23 | Ex. 8 | P. Ex. 18 | ○ | ○ | ○ |
| Ex. 33 | 24 | Ex. 11 | P. Ex. 18 | ○ | ○ | ○ |
| C. Ex. 9 | 25 | C. Ex. 1 | P. Ex. 18 | Δ~X | X | Δ~X |
| C. Ex. 10 | 26 | C. Ex. 2 | P. Ex. 18 | Δ~X | X | Δ~X |
| C. Ex. 11 | 27 | C. Ex. 3 | P. Ex. 18 | X | Δ~X | X |
| C. Ex. 12 | 28 | C. Ex. 4 | P. Ex. 18 | Δ | Δ | X |

Ex.: Example
P. Ex.: Preparative example
C. Ex.: Comparative example
Criteria of evaluation upon visual inspection
Sagging ○: none; Δ: slightly occurred; X : occurred
Unevenness ○: none; Δ: slightly occurred; X : occurred
Metallic feeling ○: excellent; Δ: ordinary; X : poor

Example 34

Preparation of emulsion 165 parts of deionized water and 0.3 parts of "Antox MS-60" were fed in a reaction vessel of 500 ml equipped with a nitrogen introducing tube, a stirrer, a cooler, a thermoregulator, and a dropping funnel. Then, 3 parts of methacrylic acid, 54.8 parts of styrene and 42.2 parts of isobornyl acrylate were fed in the dropping funnel to prepare a monomer solution, which was added dropwise to the reaction vessel over 2 hours. Simultaneously, a polymerization initiator solution which was separately prepared by dissolving 0.5 parts of ammonium persulfate in 40 parts of deionized water, was added dropwise to the vessel.

The resultant was stirred at 83° C. for further one hour and then was cooled to give a milky white emulsion. The pH value of the emulsion was adjusted to 8 by adding dimethylaminoethanolamine. The emulsion had a solid content of 30%, a particle size of 320 nm (measured by laser beam scattering method), and an acid value of 19.6.

Preparation of aqueous metallic-base coating composition 112 parts of the film forming polymer prepared in preparative example 1, 47 parts of aluminum pigment/melamine dispersion paste prepared in preparative example 4 and 47 parts of the above prepared emulsion were mixed homogeneously to give an aqueous metallic-base coating composition.

Coating and evaluation

The resulting aqueous metallic-base coating composition was applied to an intercoated steel panel, placed vertically, by two-stage air-spraying with an interval of one minute therebetween and with two-minute preheating at 80° C., in a thickness to give 20 µm after drying. Then clear coating composition prepared in Preparative Example 5 was applied thereon in the same environment, by one-stage air-spraying in a wet-on-wet style, in a thickness to give 30 µm after drying, followed by a setting for 7 minutes.

Thus coated steel panel was baked at 140° C. for 30 minutes by means of a drier to obtain coated panel.

The workability (sagging) and appearance (unevenness and metallic feeling) of thus obtained coated panel were evaluated upon visual inspection. Results are shown in Table 4.

The intercoated steel panel used, were prepared by electrodepositing an automobile coating composition onto a polished mild steel panel treated by chemical coating for degreasing, and then by primer coating thereon.

Example 35

Preparation of pigment dispersion paste 140 parts of the film forming polymer prepared in preparative example 1, 30 parts of copper phthalocyanine blue and 163 parts of deionized water mixed homogeneously to give a blue pigment dispersion paste.

Preparation of aqueous metallic-base coating composition 102 parts of the film forming polymer prepared in preparative example 1, 47 parts of the aluminum pigment dispersion past prepared in preparative example 4, 25 parts of the above prepared pigment dispersion paste and 47 parts of the emulsion prepared in preparative example 8 were mixed homogeneously to give an aqueous metallic-base coating composition.

Coating and evaluation

The resulting aqueous metallic-base coating composition was applied to an intercoated steel panel to give a coated panel, and it was evaluated in the same manner as described for example 34. Results are shown in Table 4.

Example 36

Preparation of pigment dispersion paste 86 parts of the film forming polymer prepared in preparative example 1, 100 parts of titanium oxide and 100 parts of deionized water were mixed homogeneously to give a white pigment dispersion paste.

Preparation of aqueous coating composition 26 parts of the film forming polymer prepared in preparative example 1, 286 parts of the above prepared pigment dispersion past, 30 parts of Cymel 303 and 47 parts of the emulsion prepared in preparative example 8 were mixed homogeneously to give an aqueous white coating composition.

Coating and evaluation

The resulting aqueous coating composition was applied to an intercoated steel panel, placed vertically, by two-stage air-spraying with an interval of one minute therebetween and with two-minute preheating at 80° C., followed by a setting for 7 minutes, in a thickness to give 20 µm after drying. Thus coated steel panel was baked at 140° C. for 30 minutes by means of a drier to obtain coated panel. The coated film thus obtained did not have sugging, but had plain surface and excellent gloss.

The intercoated steel panel used, were prepared by electrodepositing an automobile coating composition onto a polished mild steel panel treated by chemical coating for degreasing, and then by primer coating thereon.

Example 37

Preparation of aqueous coating composition 112 parts of the film forming polymer prepared in preparative example 1, 30 parts of CYMEL 303 and 47 parts of the emulsion prepared in preparative example 8 were well mixed to give an aqueous clear coating composition.

Coating and evaluation

The resulting aqueous coating composition was applied to an intercoated steel panel to give a coated panel, and it was evaluated in the same manner as described for example 36. The clear coated film thus obtained did not have sugging, but had flat surface and excellent gloss.

Comparative example 13

Preparation of emulsion 165 parts of deionized water and 0.3 parts of "Antox MS-60" were fed in a reaction vessel of 500 ml equipped with a nitrogen introducing tube, a stirrer, a cooler, a thermoregulator, and a dropping funnel. Then, 2.4 parts of methacrylic acid, 55.4 parts of styrene and 42.2 parts of isobornyl acrylate were fed in the dropping funnel to prepare a monomer solution, which was added dropwise to the reaction vessel over 2 hours. Simultaneously, a polymerization initiator solution which was separately prepared by dissolving 0.5 parts of ammonium persulfate in 40 parts of deionized water, was added dropwise to the vessel.

The resultant was stirred at 83° C. for further one hour and then was cooled to give a milky white emulsion. The pH value of the resultant emulsion was adjusted to 8 by adding dimethylaminoethanolamine. The emulsion had a solid content of 30%, a particle size of 300 nm (measured by laser beam scattering method), and an acid value of 15.7.

Preparation of aqueous metallic-base coating composition

The aqueous metallic-base coating composition was prepared in the same manner as described for example 34, except for using the above prepared emulsion instead of the emulsion prepared in example 34.

Coating and evaluation of aqueous metallic-base coating composition

The resulting aqueous metallic-base coating composition was applied to an intercoated steel panel to give a coated panel and it was evaluated in the same manner as described for example 34. Results are shown in Table 4.

Comparative example 14

Preparation of emulsion 200 parts of deionized water and 1 part of "RHODAPEX CO-436" (Emulsifier manufactured by Rhone-Poulenc S. A.) were fed in a reaction vessel of 500 ml equipped with a nitrogen introducing tube, a stirrer, a cooler, a thermoregulator and a dropping funnel. Then, 2.0 parts of methacrylic acid and 98 parts of styrene were fed in the dropping funnel to prepare a monomer solution, which was added dropwise to the reaction vessel over 2 hours. Simultaneously, a polymerization initiator solution which was separately prepared by dissolving 1 part of ammonium persulfate in 35 parts of deionized water, was added dropwise to the vessel.

The resultant was stirred at 83° C. for further one hour and then was cooled to give a milky white emulsion. The pH value of the resultant emulsion was adjusted to 8 by adding dimethylaminoethanolamine. The emulsion had a solid content of 30%, a particle size of 220 nm (measured by laser beam scattering method), and an acid value of 12.7.

Preparation of aqueous metallic-base coating composition

The aqueous metallic-base coating composition was prepared in the same manner as described for example 34, except for using the above prepared emulsion instead of the emulsion prepared in example 34.

Coating and evaluation of aqueous metallic-base coating composition

The resulting aqueous metallic-base coating composition was applied to an intercoated steel panel to give a coated panel and it was evaluated in the same manner as described for example 34. Results are shown in Table 4.

Comparative example 15

Preparation of film forming polymer 200 parts of deionized water and 1 part of "RHODAPEX CO-436" (Emulsifier manufactured by Rhone-Poulenc S. A.) were fed in a reaction vessel of 500 ml equipped with a nitrogen introducing tube, a stirrer, a cooler, a thermoregulator and a dropping funnel. Then, 5 parts of styrene, 21 parts of methyl methacrylate, 16 parts of 2-hydroxyethyl methacrylate, 39 parts of n-butyl acrylate, 9 parts of mathacrylic acid and 10 parts of acrylamide were fed in the dropping funnel to prepare a monomer solution, which was added dropwise to the reaction vessel over 2 hours. Simultaneously, a polymerization initiator solution which was separately prepared by dissolving 1 part of ammonium persulfate in 35 parts of deionized water, was added dropwise to the vessel. After about 1 hour, a part of the reactant began to aggregate, and after about 2 hours, the whole reactant was aggregated. Thus, the film forming polymer cannot be obtained.

Comparative example 16

Preparation of film forming polymer

An acrylic emulsion having a solid content of 54.2%, with the resin having an OH value of 29 and an acid value of 26, was prepared according to substantially the same manner as described in column 8, lines 15 to 49 of U.S. Pat. No. 4,683,260 (Wickert).

Preparation of aqueous metallic-base coating composition

The aqueous metallic-base coating composition was prepared in the same manner as described for example 34, except for using 104 parts of the above prepared film forming polymer instead of those prepared in preparative example 1.

Coating and evaluation of aqueous metallic-base coating composition

The resulting aqueous metallic-base coating composition was applied to an intercoated steel panel to give a coated panel and it was evaluated in the same manner as described for example 34. Results are shown in Table 4.

TABLE 4

| Examples & | | Appearance | |
|---|---|---|---|
| Comparative Examples | Workability Sagging | Uneven- ness | Metallic feeling |
| Ex. 34 | o | o | o |
| Ex. 35 | o | o | o |
| Ex. 36 | o | — | — |
| Ex. 37 | o | — | — |
| C. Ex. 13 | Δ | Δ ~ x | Δ ~ x |
| C. Ex. 14 | x | Δ ~ x | Δ ~ x |
| C. Ex. 15 | — | — | — |
| C. Ex. 16 | Δ ~ x | Δ ~ x | Δ ~ x |

Ex.: Example
C. Ex.: Comparative example
Criteria of evaluation upon visual inspection
Sagging o: none;
Δ: slightly occurred;
x: occurred.
Unevenness o: none;
Δ: slightly occurred;
x: occurred.
Metallic feeling o: excellent;
Δ: ordinary;
x: poor.

What is claimed is:

1. An aqueous coating composition comprising:
   (A) 10 to 95% by weight, based on solid content, of a film forming polymer which is prepared by neutralizing at least a part of acid groups contained in a copolymer having a number average molecular weight ranging from 6,000 to 50,000 prepared by copolymerizing (A1) 8 to 30% by weight of an amide group-containing ethylenically unsaturated monomer, (A2) 3 to 15% by weight of an acid group-containing ethylenically unsaturated monomer, (A3) 13 to 30% by weight of a hydroxyl group-containing ethylenically unsaturated monomer, and (A4) a remainder amount of ethylenically unsaturated monomers other than the monomers (A1) to (A3); and
   (B) 5 to 90% by weight, based on solid content, of an aqueous dispersion of carboxyl group-containing acrylic resin particles having a particle size ranging from 0.01 to 1.0 μm and an acid value ranging from 20 to 80, which is formed from
   (B1) 3 to 50% by weight of carboxyl group-containing ethylenically unsaturated monomer selected from the group consisting of styrene derivatives, (meth)acrylic acid derivatives, unsaturated dibasic acids and the mixture thereof; and
   (B2) 50 to 97% by weight of ethylenically unsaturated monomer selected from the group consisting of (meth) acrylates having no reactive functional group, polymerizable aromatic compounds, hydroxyl group-containing unsaturated compounds, polymerizable amides, polymerizable nitriles, vinyl halides, α-olefins, vinyl esters, dienes, polymerizable unsaturated monocarboxylic acid esters of polyhydric alcohol, polymerizable unsaturated alcohol esters of polybasic acid, aromatic compounds substituted by two or more vinyl groups, addition products of epoxy group-containing ethylenically unsaturated monomer and carboxyl group-containing ethylenically unsaturated monomer, and the mixture thereof.

2. The aqueous coating composition according to claim 1, wherein number average molecular weight of said film forming polymer is from 8,000 to 30,000.

3. The aqueous coating composition according to claim 1, wherein said amide group-containing ethylenically unsaturated monomer (A1) is (meth)acrylamide.

4. The aqueous coating composition according to claim 1, wherein said acid group-containing ethylenically unsaturated monomer (A2) contains carboxyl group.

5. The aqueous coating composition according to claim 1, wherein said aqueous dispersion of carboxyl group-containing acrylic resin particles is an emulsion which is prepared by emulsion polymerization.

6. The aqueous coating composition according to claim 1, wherein said aqueous dispersion of carboxyl group-containing acrylic resin particles is prepared by emulsion polymerizing (B1) carboxyl group-containing ethylenically unsaturated monomers selected from the group consisting of styrene derivatives, (meth)acrylic acid derivatives, unsaturated dibasic acids and the mixture thereof with (B2) ethylenically unsaturated monomers other than the monomer (B1) being selected from the group consisting of (meth) acrylates having no reactive functional group, polymerizable aromatic compounds, hydroxyl group-containing unsaturated compounds, polymerizable amides, polymerizable nitriles, vinyl halides, α-olefins, vinyl esters, dienes, polymerizable unsaturated monocarboxylic acid esters of polyhydric alcohol, polymerizable unsaturated alcohol esters of polybasic acid, aromatic compounds substituted by two or more vinyl groups, addition products of epoxy group-containing ethylenically unsaturated monomer and carboxyl group-containing ethylenically unsaturated monomer, and the mixture thereof.

7. The aqueous coating composition according to claim 1, wherein said composition further contains a metallic pigment in amounts of from 2 to 100 parts by weight based on 100 parts by weight, based on solid content, of said aqueous coating composition.

8. The aqueous coating composition according to claim 1, wherein said composition further contains an urethane-containing aqueous dispersion in amounts of from 5 to 90 parts by weight based on 100 parts by weight, based on solid content, of said aqueous coating composition.

9. The aqueous coating composition according to claim 1, wherein the film forming polymer is prepared by solution polymerization process.

* * * * *